(12) United States Patent
Emilsson

(10) Patent No.: US 8,807,296 B2
(45) Date of Patent: Aug. 19, 2014

(54) RAIL VEHICLE BRAKE UNIT

(75) Inventors: Fred Emilsson, Landskrona (SE); Johan Martensson, legal representative, Landskrona (SE)

(73) Assignee: Faiveley Transport Nordic AB, Landskrona (SE)

( * ) Notice: Subject to any disclaimer, the term of this patent is extended or adjusted under 35 U.S.C. 154(b) by 1535 days.

(21) Appl. No.: 11/992,650

(22) PCT Filed: Sep. 20, 2006
(Under 37 CFR 1.47)

(86) PCT No.: PCT/SE2006/050345
§ 371 (c)(1),
(2), (4) Date: Jul. 15, 2009

(87) PCT Pub. No.: WO2007/037750
PCT Pub. Date: Apr. 5, 2007

(65) Prior Publication Data
US 2010/0219028 A1    Sep. 2, 2010

(30) Foreign Application Priority Data

Sep. 30, 2005    (SE) ...................................... 0502153

(51) Int. Cl.
*F16D 55/08*    (2006.01)
*F16D 65/00*    (2006.01)

(52) U.S. Cl.
USPC ....... 188/72.7; 188/71.7; 188/196 V; 188/197

(58) Field of Classification Search
USPC ....... 188/72.7, 71.7, 71.8, 153 R, 197, 196 R, 188/196 M, 196 V, 1.11 R
See application file for complete search history.

(56) References Cited

U.S. PATENT DOCUMENTS

| | | | | |
|---|---|---|---|---|
| 728,449 | A * | 5/1903 | Clark ................................ 84/99 |
| 3,535,944 | A * | 10/1970 | Newstead ....................... 74/110 |
| 3,995,537 | A | 12/1976 | Severinsson |
| 4,405,037 | A * | 9/1983 | Severinsson et al. ..... 188/196 D |
| 4,953,675 | A * | 9/1990 | Aldrich ....................... 192/223.3 |
| 5,746,452 | A * | 5/1998 | El-Ibiary et al. .............. 384/446 |
| 5,884,974 | A * | 3/1999 | Bergsten et al. ......... 297/411.35 |
| 5,937,974 | A * | 8/1999 | Cathcart et al. ............... 188/203 |
| 6,397,986 | B2 | 6/2002 | Moore |
| 2002/0104977 | A1* | 8/2002 | Bircann et al. ........... 251/129.15 |

FOREIGN PATENT DOCUMENTS

| | | |
|---|---|---|
| DE | 26 53 320 A1 | 6/1978 |
| EP | 0 011 618 B1 | 11/1981 |
| WO | WO 80/00605 A1 | 4/1980 |
| WO | WO 02/096736 A1 | 12/2002 |

* cited by examiner

*Primary Examiner* — Melody Burch
(74) *Attorney, Agent, or Firm* — Breiner & Breiner, L.L.C.

(57) ABSTRACT

A brake unit, preferably for a rail vehicle, including in a housing: a piston, and a push rod in the form of a spindle in an axial slack adjuster. The axial directions of the piston and the push rod are substantially perpendicular to each other, and means are provided for force transmission between these parts. The force transmitting means includes wedge elements at the underside of the piston cooperating with a driver element coaxial with and force-transmittingly connected to the spindle. The driver element is supported with rolling friction by the housing for movements in the axial direction of the spindle, and the spindle is axially guided by the housing at its forward end.

13 Claims, 3 Drawing Sheets

RAIL VEHICLE BRAKE UNIT

TECHNICAL FIELD

The present invention relates to a brake unit, preferably for a rail vehicle, the unit comprising in a housing:
a piston, and
a push rod in the form of a spindle in an axial slack adjuster,
the axial directions of the piston and the push rod being substantially perpendicular to each other and means being provided for force transmission between these parts,
said force transmitting means comprising wedge elements at the underside of the piston cooperating with a driver element coaxial with and force-transmittingly connected to the spindle.

BACKGROUND OF THE INVENTION

A brake unit of this type is shown in U.S. Pat. No. 3,995,537 and has been commercially successful for a great number of years. In order to further improve this brake unit, development work has been performed. A major goal with this work has been to improve the internal guiding, which in the known unit is performed by sliding friction between a common slack adjuster tube and the housing at two places, and to reduce the mechanical hysteris of the unit.

THE INVENTION

An improved guiding is according to the invention obtained in that the driver element is supported with rolling friction by the housing for movements in the axial direction of the spindle and in that the spindle is axially guided by the housing at its forward end.

In a practical embodiment the driver element is provided at either side of the spindle with a support roller for cooperation with a support plane in the housing.

These support rollers, which in a desired three-point guiding or triangular guiding provide two points, are preferably arranged coaxially with and outside of working rollers rotatably arranged on the driver element for transferring force from the wedge elements on the piston to the driver element.

The third guiding in the three-point guiding may in this practical embodiment be obtained in that the driver element is provided with a driver sleeve, which surrounds the spindle, extends forward into axially guided relationship with the housing and is internally provided with means for axially guiding the spindle. This means may preferably be an internal guide ring.

In the known unit of U.S. Pat. No. 3,995,537 the slack adjuster, shown specifically in U.S. Pat. No. 4,585,097, comprises an adjuster nut and a leader nut in non-self locking thread engagement with the spindle. The slack adjuster is contained in a common adjuster tube within the driver element.

In the brake unit according to the invention the adjuster nut is arranged within the driver sleeve, whereas the leader nut is partly surrounded by a non-rotatable support sleeve; here, the driver element extends radially inwards to the leader nut in the area between the adjuster nut and the support sleeve.

This means that it is possible to decrease the diameter of the central circular hole of the driver element from say 70 mm to say 35 mm and to decrease the overall dimensions of the unit considerably, which is of great importance, as the space available in the undercarriages of rail vehicles is often extremely limited in the regions where such brake units may be mounted.

A locking washer may preferably be arranged between the driver element and the leader nut for transmitting a locking force to a clutch between the leader nut and the support sleeve from a return spring acting on the driver element. In this way the desired locking of this clutch in the released condition of the brake unit may be obtained in the shortest possible way, i.e. with as few parts involved as possible.

A first indicator may be provided for assessing the axial position of the leader nut, as this position indicates whether the brake is applied or released.

Also a second indicator may be provided for assessing rotational movements of the leader nut. These movements can be translated into axial movements of the spindle and provide indications of the wear of a brake pad connected to the brake unit. When the brake pad is worn out, a signal may be given that a replacement is needed.

Each such indicator may be arranged in an indicator housing at the rear end of the brake unit, and the leader nut may be provided with an indicator sleeve extending to the proximity of the indicator.

The indicators are preferably inductive transmitters, and the indicator sleeve of inductive metal is preferably provided with axial teeth and grooves.

The first indicator may indicate the presence or not of the indicator sleeve in its proximity, whereas the second indicator may transmit a signal corresponding to the number of sleeve teeth passing the indicator, i.e. the rotational movement of the indicator sleeve.

The brake unit of the invention is normally operated by pressurized fluid, i.e. compressed air, but a manual parking brake mechanism may in many instances be required. In the brake unit shown in U.S. Pat. No. 3,995,537 the parking brake mechanism cooperates with the driver element.

In the present brake unit a manual parking brake mechanism is instead provided in a modified cover for cooperation with the piston of the brake unit.

In a practical embodiment a shaft provided with an external lever is pivotally journalled in the cover, and an internal arm arrangement for engagement with the piston is attached to the shaft. The arm arrangement is preferably provided with an actuation roller for engagement with the piston.

This parking brake mechanism provides great versatility in all respects.

BRIEF DESCRIPTION OF THE DRAWINGS

The invention will be described in further detail below under reference to the accompanying drawings, in which.

DETAILED DESCRIPTION OF PREFERRED EMBODIMENTS

Figure 1:
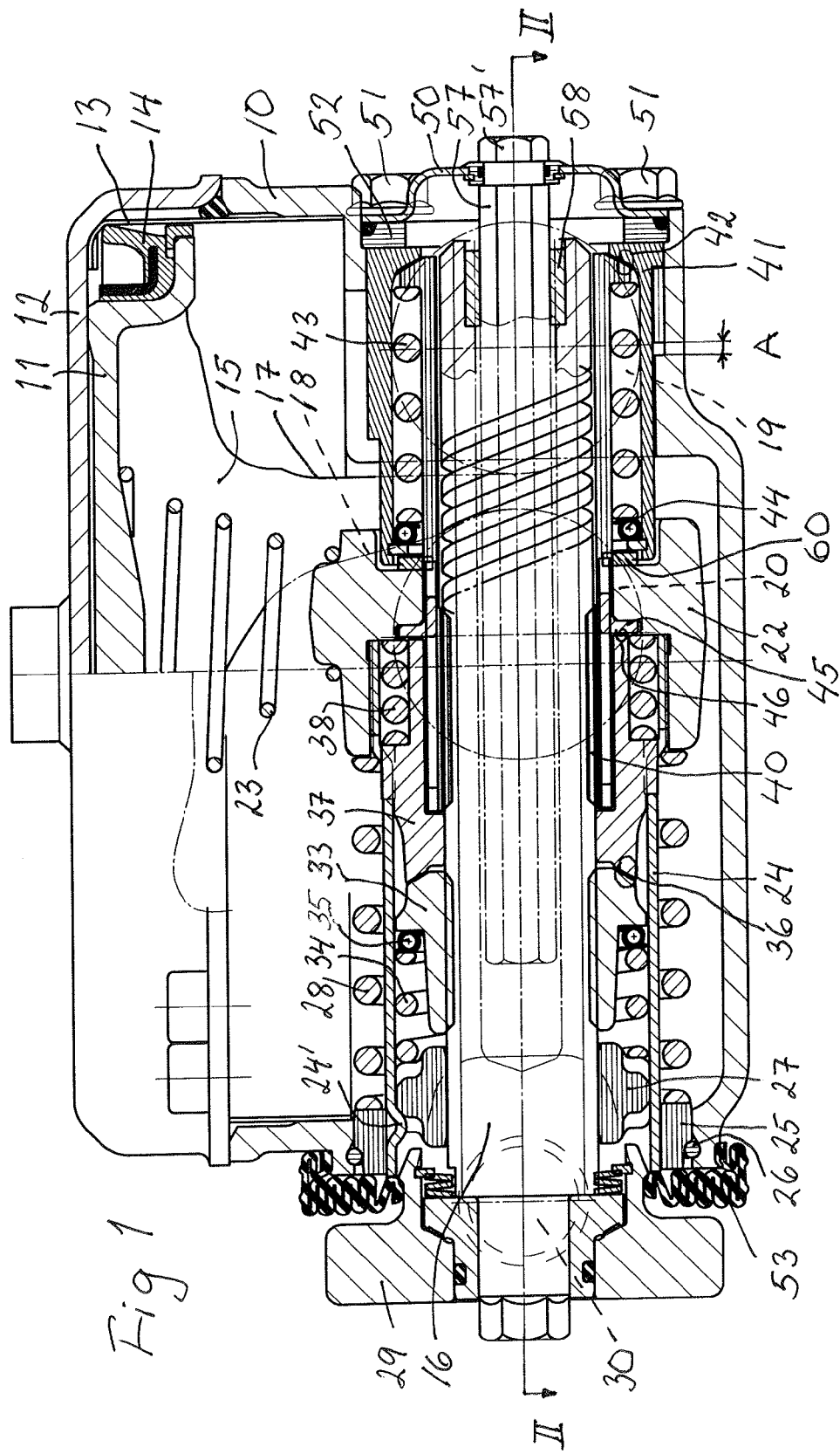
FIG. 1 shows a longitudinal cross-section through a brake unit according to the invention.
Figure 2:
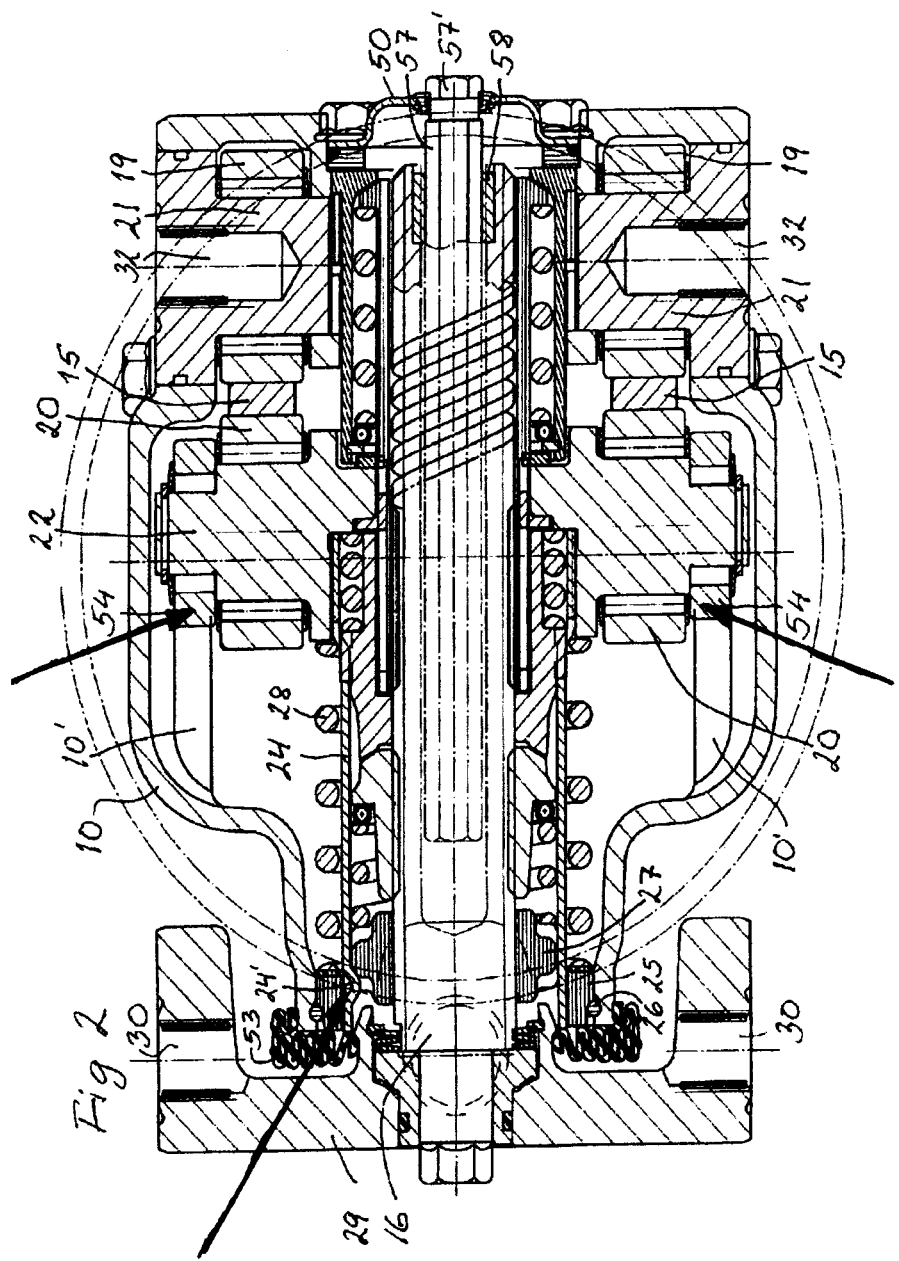
FIG. 2 is a section along the line II-II in FIG. 1 with certain parts omitted for enhanced clarity.

A brake unit for a rail vehicle is shown in section in FIGS. 1 and 2. A brake unit generally comprises a brake cylinder (or a similar brake actuating means) and a slack adjuster built into a common housing.

When used in this specification, terms like "vertical", "horisontal", "below" and "above" are used with reference to the position of the brake unit on the drawings, even if the brake unit when mounted on a rail vehicle may well have other positions.

The brake unit has a housing 10, which is cylinder-shaped in its upper end. A piston 11 is vertically movably arranged in this cylinder-shaped upper part of the housing 10. A cover 12 above the piston 11 is screwed to the housing 10. A cylinder liner 13 may be arranged, and the piston 11 can be provided with a conventional piston sealing 14.

At its underside the piston 11 is provided with two generally vertical wedge elements 15. When compressed air is admitted to the space above the piston 11, pushing it down into its cylinder, the wedge elements 15 will transmit a force to further parts of the brake unit, as will be described below. More specifically, the force is transferred from a force in the vertical direction in the drawing generally perpendicularly into a force in the horisontal direction to the left in the drawing in a push rod represented by a spindle 16 of a slack adjuster to be described.

Each wedge element 15 has a reaction surface 17 parallel with the axis of the piston 11 and a wedge surface 18 inclined relative thereto. The wedge elements 15 extend between rollers 19 and 20 in the housing 10 and in a force transmitting chain to the spindle 16, respectively, as will appear.

Housing rollers or reaction rollers 19 are journalled on stub axles 21 inserted in the housing. Working rollers 20 are journalled on a driver element 22, force-transmittingly connected to the spindle 16 in a way to be described.

It appears that when the piston 11 is pushed down under the force from compressed air, the working rollers 20 and thus the spindle 16 will be pushed to the left in the drawings by the wedge elements 15.

A return spring 23 of compression-type for the piston 11 is arranged between the driver element 22 and the piston.

A tubular driver sleeve 24 is threadingly connected to the driver element 22 and extends to the left in the drawings, the thread direction being such that a tightening moment is applied to the connection at the application of the brake unit. The driver sleeve 24 is guided for axial movements in relation to a forward opening in the housing 10 by means of a first, external guide ring 25, attached to the housing by a spring ring 26, and a second, internal guide ring 27. This second guide ring 27 has an inner diameter corresponding to the outer diameter of the spindle 16 and an outer diameter corresponding to the inner diameter of the driver sleeve 24, which is provided with an internal shoulder 24' for the second guide ring 27 to bear against. The two guide rings 25 and 27 may be made of plastic material.

A return spring 28 of compression-type for the driver element 22 with its driver sleeve 24 is arranged around the driver sleeve 24 between the driver element 22 and the external guide ring 25, attached to the housing 10.

An external yoke 29 is attached to the spindle 16 by conventional means, which are not further described and normally provides a fixed connection, but can allow mutual rotation at will, normally for manual return of the slack adjuster at replacement of worn-out brake blocks or brake pads. The yoke 29 is provided with two holes 30, and the two stub axles 21 are provided with holes 32, the holes 30 and 32 being intended for pivotable connection to a disc brake caliper arrangement in a rail vehicle, as is well known in the art. In this way the spindle 16 is operationally held against rotation.

The mechanism within the brake unit, especially the slack adjuster, will now be described. Both FIG. 1 and FIG. 2 show the slack adjuster and all its elements, but only FIG. 1 is provided with all reference numerals relating to the slack adjuster for the sake of clarity.

An adjuster nut 33 arranged inside the driver sleeve 24 is in non-self locking thread engagement with the spindle 16. It is biassed to the right in FIG. 1 by means of an adjuster nut spring 34 of the helical compression type, which is supported against the nut by means of a thrust bearing 35 allowing relative rotation. A first clutch 36, preferably toothed, is formed between the adjuster nut 33 and a clutch ring 37, which is axially movable within the driver sleeve 24 to a limited extent by having axial ridges in engagement with corresponding axial slits in the driver sleeve. The clutch ring 37 is biassed to the left in FIG. 1 in the driver sleeve 24 by means of a compression spring 38, supported in the driver element 22.

A leader nut 40 is in non-self locking thread engagement with the spindle 16. It is arranged within a control sleeve 41, which is arranged axially movable in the housing 10 a distance A, called the control distance and corresponding to the desired slack for the slack adjuster. The leader nut 40 and the control sleeve 41 form a preferably toothed second clutch 42, biassed into engagement by means of a helical compression spring 43 arranged between the nut and the sleeve. A thrust bearing 44 will allow relative rotation between these two parts.

Towards its forward end or end to the left in FIG. 1 the leader nut 40 is provided with a locking ring 45, which is non-rotatably but axially movably arranged on the leader nut 40. A third clutch 46 can hereby be created between the leader nut 40 and the clutch ring 37 only allowing the former to move axially but not rotate when engaged, i e when the bias of the compression spring 38 is overcome.

The support sleeve 41 is to the right in FIG. 1 supported by an end cover 50, which is held to the housing 10 by means of screws 51. A sealing ring 52 for preventing the intrusion of moist, dirt and the like may be arranged under the end cover 50.

The function of the slack adjuster mainly formed by the spindle 16, the adjuster nut 33, and the leader nut 40 is per se known and is accordingly not described. Reference is in this respect made to EP-B-0 011 618, where a function description of a very similar slack adjuster can be found. It may here be sufficient to state that the slack adjuster is of the single-acting, clearance-sensing type.

A protecting bellows 53 is arranged between the housing 10 and the external yoke 29.

Reference is now made to FIG. 2, where the brake unit is shown in a horisontal section and where the slack adjuster is not provided with reference numerals for the sake of clarity. Illustrated in this Figure are especially the wedge elements 15, the housing rollers 19 with its stub axles 21, and the working rollers 20 on the driver element 22.

The driver element 22 is supported or guided by the housing 10 in the following way. Coaxially with—and outside— each of the two working rollers 20, the driver element 22 is provided with a rotatably journalled support roller 54 supported by and cooperating with a support plane 10' in the housing 10. The size of the support plane 10' is such that the driver element 22 will be fully supported over its entire possible working movement to the left and right in FIGS. 1 and 2.

The slack adjuster of the brake unit has the function to move the non-rotatable spindle 16 to the left in the drawings to the extent determined by the wear of the brake block operated by the brake unit. When this brake block is worn-out and is to be replaced, the spindle 16 has to be brought back manually to the right to a position as shown in FIGS. 1 and 2.

A mechanism for this purpose may have the following design: A rod 57 with angular, for example hexagonal, cross-sectional shape is rotatably journalled in the end cover 50 and extends into a longitudinal bore in the spindle 16. A sleeve 58 with an inner cross-sectional shape corresponding to the cross-sectional shape of the rod 57 is attached in the spindle bore. With a suitable tool in engagement with a rod end 57' extending out of the cover 50 the rod 57 and hereby the spindle 16 may be rotated in the adjuster nut 33 and the leader nut 40 for bringing the spindle 16 to the right in the drawings.

It is important to secure that the clutch 42 between the leader nut 40 and the control sleeve 41 is held in an engaged position or locked except when the A-measure has been traversed during brake application. In the present brake unit this function is performed by a locking washer 60 between the driver element 22 and the control sleeve 41, with which it is in engagement at its inner circumference at movements to the right in the drawing. Hereby, the force from the return spring 28 will be applied on the control sleeve 41 and thus the clutch 42 via the driver element 22 and the locking washer 60.

Figure 3:
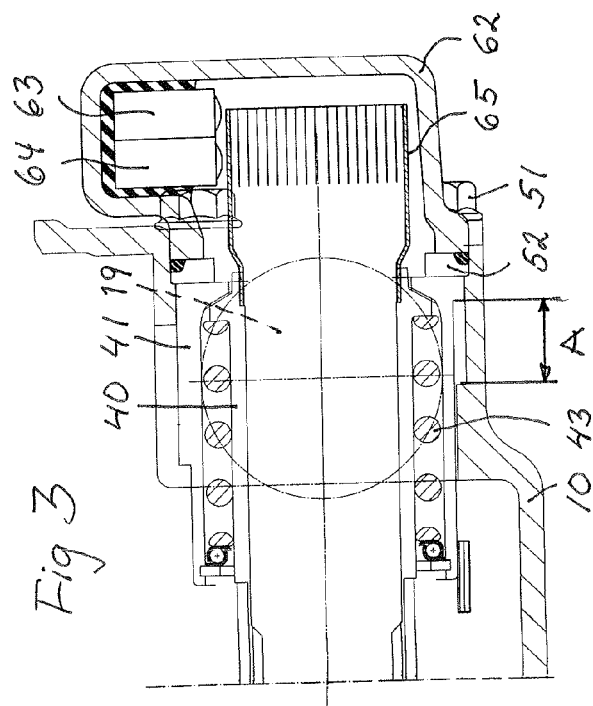
FIG. 3 shows a portion of the cross-section of FIG. 1 and illustrates a modification.

FIG. 3 illustrates a modified brake unit provided with an indicator device. FIG. 3 shows a portion to the right in FIG. 1, and the following main elements therefrom may be recognized: the housing 10, the housing rollers 19, the leader nut 40, the control sleeve 41, the compression spring 43, the screws 51, and the sealing ring 52.

The end cover 50 of FIG. 1 is here replaced by an indicator housing 62 containing a first indicator 63 and a second indicator 64 in proximity to an indicator sleeve 65 attached to the leader nut 40. The two indicators 63 and 64 are preferably transmitters of the inductive type, and the indicator sleeve 65 is preferably provided with alternating axial teeth and grooves of metal for providing a basis for the indicator signals.

The first indicator 63 is intended to transmit signals regarding the operational status of the brake: applied or released. When the brake is released—or rather not applied—the first indicator 63 will transmit a signal, as the indicator sleeve 65 is below the indicator 63, which is not the case, when the brake is applied and the indicator sleeve 65 is brought forward to the left together with the leader nut 40.

The second indicator 64 is intended to transmit signals regarding brake pad wear and stroke of the spindle 16. At each brake application with a stroke exceeding the set value, i.e. the A-measure, the leader nut 40 and thus the indicator sleeve 65 will rotate to an extent sensed by the second indicator 64. The accumulated values transmitted by the second indicator 64 indicates the brake pad wear or the stroke of the spindle 16, so that a worn-out brake pad can be replaced at the proper time, for example after a total stroke of 60-80 mm for the spindle 16.

The two indicators 63 and 64 are preferably connected to an indicator unit of a control system of the vehicle. When a new brake pad has been mounted and the spindle has been manually brought back to the right in the drawing, the indicator unit is preferably set to zero.

Figure 4:
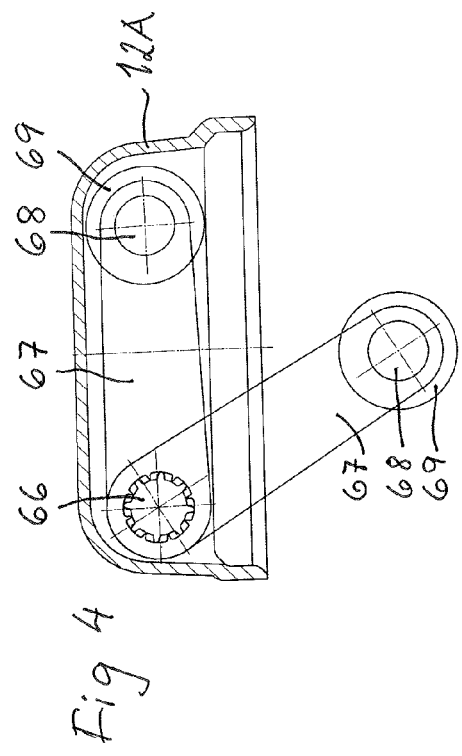
FIG. 4 is a cross-section through a modified cover including a parking brake arrangement for a brake unit according to the invention.
Figure 5:
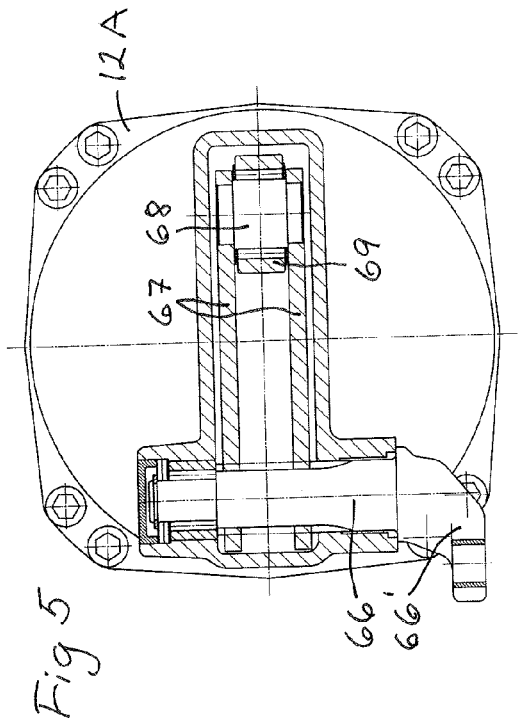
FIG. 5 is a plan view mostly in cross-section of the arrangement shown in FIG. 4.

FIGS. 4 and 5 illustrate a parking brake mechanism for a brake unit. This mechanism is arranged in a modified cover 12A to be screwed to the housing 10 of the brake unit (FIG. 1) and is intended for mechanical cooperation with its piston 11.

A parking brake shaft 66 is pivotally journalled in the cover 12A. Extending out of the cover is a lever 66', to which a mechanical actuation means may be connected. This mechanical actuation means is not shown but may for example comprise a wire or rod, as is well known to any person skilled in the art. A parking brake arm arrangement 67 is connected to the shaft 66. Preferably, the connection is a spline connection, as is most clearly illustrated in FIG. 4, so that the relative position between the shaft and the arm arrangement may be varied. As shown in FIG. 5, the arm arrangement may comprise two arms, between which an axle 68 with a rotatable actuation roller 69 is attached.

By turning the parking brake shaft 66 the parking brake arm arrangement 67 with the actuation roller 69 may be transferred from a rest position as shown in the upper part of FIG. 4 to an actuation position as shown in the lower part of FIG. 4, in which its roller 69 mechanically pushes the piston 11 (FIG. 1) down to obtain brake actuation.

The mechanical push force on the piston 11 will increase progressively during application due to the decreasing application lever.

By varying the length of the arm arrangement 67, the stroke of the parking brake arrangement may be varied to suit different conditions.

The parking brake arrangement shown and described provides great versatility with regard to possible positions and external actuation directions, in that the cover 12A may be mounted in four different positions and by the provision of the spline connection between the shaft 66 and the arm arrangement 67.

The invention claimed is:

1. A brake unit comprising in a housing:
   a piston, and
   a spindle in an axial slack adjuster,
   wherein an axial direction of the piston and an axial direction of the spindle are substantially perpendicular to each other and force transmitting means is provided between the piston and the spindle,
   said force transmitting means comprising wedge elements at an underside of the piston cooperating with a driver element coaxial with and force-transmittingly connected to the spindle,
   wherein the brake unit includes a three-point guiding where the driver element is supported by rolling friction with the housing for movements in the axial direction of the spindle, wherein the driver element includes on each side of the spindle a support roller for cooperation with a support plane in the housing, and the spindle is axially guided by the housing at a forward end thereof; and wherein the support roller is arranged coaxially with and outside of working rollers rotably arranged on the driver element for transferring force from the wedge elements on the piston to the driver element, and
   wherein the driver element is provided with a driver sleeve, which surrounds the spindle, extends forward into axially guided relationship with the housing and is internally provided with a guide for axially guiding the spindle.

2. A brake unit according to claim 1, wherein said guide is an internal guide ring.

3. A brake unit according to claim 1, wherein the axial slack adjuster comprises an adjuster nut and a leader nut in non-self locking thread engagement with the spindle, the adjuster nut being arranged within the driver sleeve and the leader nut being partly surrounded by a non-rotatable support sleeve, wherein the driver element extends radially inwards to the leader nut in an area between the adjuster nut and the support sleeve.

4. A brake unit according to claim 3, further comprising a locking washer arranged between the driver element and the leader nut for transmitting a locking force to a clutch between the leader nut and the support sleeve from a return spring acting on the driver element.

5. A brake unit according to claim 3, further comprising an indicator for assessing axial position of the leader nut.

6. A brake unit according to claim 3, further comprising an indicator for assessing rotational movements of the leader nut.

7. A brake unit comprising in a housing:
a piston, and
a push rod in a form of a spindle in an axial slack adjuster,
wherein an axial direction of the piston and an axial direction of the push rod are substantially perpendicular to each other and force transmitting means is provided between the piston and the push rod,
said force transmitting means comprising wedge elements at an underside of the piston cooperating with a driver element coaxial with and force-transmittingly connected to the spindle, and
wherein the driver element is supported with rolling friction by the housing for movements in the axial direction of the spindle, and the spindle is axially guided by the housing at a forward end thereof; wherein the driver element is provided with a driver sleeve, which surrounds the spindle, extends forward into axially guided relationship with the housing and is internally provided with a guide for axially guiding the spindle; wherein the axial slack adjuster comprises an adjuster nut and a leader nut in non-self locking thread engagement with the spindle, the adjuster nut being arranged within the driver sleeve and the leader nut being partly surrounded by a non-rotatable support sleeve, wherein the driver element extends radially inwards to the leader nut in an area between the adjuster nut and the support sleeve; wherein said brake unit includes an indicator for assessing axial position of the leader nut; and wherein said indicator is arranged in an indicator housing at a rear end of the brake unit and wherein the leader nut is provided with an indicator sleeve extending proximally of the indicator.

8. A brake unit according to claim 7, wherein the indicator is an inductive transmitter and the indicator sleeve is of inductive metal provided with axial teeth and grooves.

9. A brake unit according to claim 1, further comprising a manual parking brake mechanism in a modified cover for cooperation with the piston of the brake unit.

10. A brake unit according to claim 9, further comprising a shaft provided with an external lever pivotally journalled in the modified cover and wherein an internal arm arrangement for engagement with the piston is attached to the shaft.

11. A brake unit comprising in a housing:
a piston,
a push rod in a form of a spindle in an axial slack adjuster,
a manual parking brake mechanism in a modified cover for cooperation with the piston of the brake unit, and
a shaft provided with an external lever pivotally journalled in the modified cover and wherein an internal arm arrangement for engagement with the piston is attached to the shaft and wherein the arm arrangement includes an actuation roller for engagement with the piston,
wherein an axial direction of the piston and an axial direction of the push rod are substantially perpendicular to each other and force transmitting means is provided between the piston and the push rod,
said force transmitting means comprising wedge elements at an underside of the piston cooperating with a driver element coaxial with and force-transmittingly connected to the spindle, and
wherein the driver element is supported with rolling friction by the housing for movements in the axial direction of the spindle, and the spindle is axially guided by the housing at a forward end thereof.

12. A brake unit comprising in a housing:
a piston, and
a push rod in a form of a spindle in an axial slack adjuster,
wherein an axial direction of the piston and an axial direction of the push rod are substantially perpendicular to each other and force transmitting means is provided between the piston and the push rod,
said force transmitting means comprising wedge elements at an underside of the piston cooperating with a driver element coaxial with and force-transmittingly connected to the spindle, and
wherein the driver element is supported with rolling friction by the housing for movements in the axial direction of the spindle, and the spindle is axially guided by the housing at a forward end thereof; wherein the driver element is provided with a driver sleeve, which surrounds the spindle, extends forward into axially guided relationship with the housing and is internally provided with a guide for axially guiding the spindle; wherein the axial slack adjuster comprises an adjuster nut and a leader nut in non-self locking thread engagement with the spindle, the adjuster nut being arranged within the driver sleeve and the leader nut being partly surrounded by a non-rotatable support sleeve, wherein the driver element extends radially inwards to the leader nut in an area between the adjuster nut and the support sleeve; wherein said brake unit includes an indicator for assessing rotational movements of the leader nut; and wherein said indicator is arranged in an indicator housing at a rear end of the brake unit and wherein the leader nut is provided with an indicator sleeve extending proximally to the indicator.

13. A brake unit according to claim 12, wherein the indicator is an inductive transmitter and the indicator sleeve is of inductive metal provided with axial teeth and grooves.

* * * * *